United States Patent [19]

Christiansen

[11] Patent Number: 4,614,646

[45] Date of Patent: Sep. 30, 1986

[54] STABILIZATION OF PEROXIDE SYSTEMS IN THE PRESENCE OF ALKALINE EARTH METAL IONS

[75] Inventor: Steven H. Christiansen, Angleton, Tex.

[73] Assignee: The Dow Chemical Company, Midland, Mich.

[21] Appl. No.: 686,111

[22] Filed: Dec. 24, 1984

[51] Int. Cl.$^4$ ............................................. C01B 15/02
[52] U.S. Cl. ........................................ 423/272; 8/109; 162/78; 252/186.29; 423/273
[58] Field of Search ............................... 423/272, 273; 252/186.29; 8/109; 162/78

[56] References Cited

U.S. PATENT DOCUMENTS

| | | | |
|---|---|---|---|
| 3,122,417 | 2/1964 | Blaser et al. | 23/207.5 |
| 3,234,140 | 2/1966 | Irani | 252/186 |
| 3,701,825 | 10/1972 | Radimer et al. | 423/273 |
| 3,860,391 | 1/1975 | Kling et al. | 162/77 |
| 4,238,282 | 12/1980 | Hyde | 162/76 |
| 4,239,643 | 12/1980 | Kowalski | 252/182 |
| 4,294,575 | 10/1981 | Kowalski | 8/111 |

FOREIGN PATENT DOCUMENTS 1234320 6/1971 United Kingdom .

*Primary Examiner*—John Doll
*Assistant Examiner*—Wayne A. Langel
*Attorney, Agent, or Firm*—A. C. Ancona

[57] ABSTRACT

An aqueous composition containing hydrogen peroxide, or a precursor which will form said peroxide in aqueous solution, is inhibited from decomposition in the presence of small amounts of copper, iron, manganese or other transition metal ions and in the presence of significant amounts of alkaline earth metal ions, e.g. Ca or Mg, by the presence of a combination of inhibitors one being from the group consisting of alkyleneaminephosphonic acids and the other being from the group consisting of polyalkylenepolycarboxylic acids and their analogous amides and sulfonic acid derivatives.

20 Claims, No Drawings

STABILIZATION OF PEROXIDE SYSTEMS IN THE PRESENCE OF ALKALINE EARTH METAL IONS

BACKGROUND OF THE INVENTION

Solutions of hydrogen peroxide are utilized for bleaching cellulosic materials, e.g. paper pulps, cotton, linen, jute and the like yarns and woven materials made therefrom. A principal problem is the stabilization of such peroxide solutions during storage prior to and during their use in the above applications. Stabilizers have been used in the past, some of which perform better under acid conditions while others work better under alkaline conditions. Polyphosphates and dipicolinic acid or quinolinic acid will stabilize peroxy solutions in acid media, but not in alkaline solutions, especially those having a pH above 10. Acyltion products of phosphorous acid, e.g. the reaction product with organic acid anhydrides, such as propionic, butyric or caproic anhydrides, or acid chlorides, such as acetyl chloride, have been disclosed as useful in stabilizing $H_2O_2$ solutions at pH 10 and above in U.S. Pat. No. 3,122,417. Other phosphonic acid derivatives including amino tri(methylphosphonic acid) and amino tri(ethylidenephosphonic acid) and other like ammonia derived organo phosphonic acids and their salts are disclosed as useful in stabilizing peroxy solutions at alkaline pH conditions in U.S. Pat. No. 3,234,140.

A later patent, U.S. Pat. No. 3,701,825, discloses the use of ethylenediaminetetra(methylenephosphonic acid) and its salts as stabilizers for peroxy-solutions at acid or basic conditions (pH of 1.5 to 13.5). This patent also indicates that the addition of nitrate ion into the solution provides a less corrosive solution.

Bleaching of cellulosic fibers has in the past been conducted with hydrogen peroxide, employing sodium silicate as a stabilizer, but this system results in problems when insoluble silicates are deposited upon the fibers and the machinery employed. When deposited on kraft paper fibers the result is a harsher feel of the paper. The fouling of equipment can cause down-time and shortened life of the equipment. Because of this, silicate-free systems have been suggested.

These silicate-free systems have been found to work well when magnesium salts are preset and, where high amounts of peroxide are employed, the addition of poly($\alpha$-hydroxyacrylate) as a stabilizer is useful.* The presence of the polyacrylate also improves the brightness (See British Pat. No. 1,425,307).

*The use of this stabilizer was discussed in a paper "Hydrogen Peroxide Bleaching of Kraft Pulp and the Role of Stabilization of Hydrogen Peroxide," by G. Papageorges, et al. given at the ESPRA Meeting in Maastricht, Netherlands, May 1979. The British patent gives a method for the preparation of the stabilizer.

In U.S. Pat. No. 3,860,391 the bleaching of cellulose fibers and mixtures of these with synthetic fibers is accomplished by employing peroxide in a silicate-free system in the presence of an aliphatic hydroxy compound, an amino alkylenephosphonic acid compound and, alternatively, with the addition of a polyaminocarboxylic acid. Representative of the above are erythritol or pentaerythritol, ethylene diaminotetra(methylenephosphonic acid) of 1-hydroxypropane-1,1,3-triphosphonic acid and ethylenediaminotetraacetic acid or nitrilotriacetic acid, respectively.

Another patent, U.S. Pat. No. 4,238,282, describes a pulp bleaching system employing chlorine (not peroxide) which uses various chelating agents, including polyacrylic acid (mol. wt.<2000), alkylene polyaminocarboxylic acids, and aminophosphonic acids and their salts.

Other more recent U.S. patents which employ such phosphonates as indicated above, but in a peroxide bleaching system, include U.S. Pat. No. 4,239,643 and U.S. Pat. No. 4,294,575.

While, as noted above, various combinations of chelating agents are useful in stabilizing peroxide bleaching systems, the presence of metal ions, e.g. iron, manganese and copper, provides a catalytic effect with respect to the decomposition of the peroxide and also tends to reduce the brightness of finished mechanical pulps. While the chelants might be expected to take care of minor amounts of the metal ions, the presence of significant amounts of magnesium and/or calcium ions which may be present in the wood pulp or water or both tends to overwhelm the ability of the chelants to complex the iron, manganese and copper ions present.

Certain combinations of the aminephosphonates together with polycarboxylic acids or polycarboxylic amides or a sulfonic acid derivative of a polyamide have now been found to provide stabilization in the presence of significant amounts of magnesium and/or calcium ions and in the presence of small amounts of copper ions and the like which catalyze the peroxide decomposition.

SUMMARY OF THE INVENTION

An aqueous composition containing hydrogen peroxide, or a precursor which will form said peroxide in aqueous solution, is inhibited from decomposition in the presence of small amounts of copper, iron, manganese or other transition metal ions and in the presence of significant amounts of alkaline earth metal ions, e.g. Ca or Mg, by the presence of a combination of inhibitors from the group including (1) aminephosphonic acids and (2) polyalkylenepolycarboxylic acids or their analogous amides and sulfonic acid derivatives thereof. Included therein are alkali metal, ammonium or amine salts of the acid radicals, namely phosphonic, carboxylic and sulfonic.

DETAILED DESCRIPTION OF THE INVENTION

The present invention provides for a combination stabilizing agent for aqueous peroxide solutions useful in bleaching cellulosic materials including paper pulp and other fibrous materials such as cotton, linen, jute, rayon and the like. The stabilizing agent is the combination of an amino phosphonic acid, e.g. diethylenetriaminepentamethylenephosphonic acid or its ammonium, alkali metal or amine salts together with a polymer of an unsaturated carboxylic acid or amide, e.g. acrylic acid or its ammonium, alkali metal or amine salts and acrylamide. These stabilizer combinations are effective in stabilizing peroxy-containing solutions over a wide range of pH, i.e. from about a pH of 1.0 to about 14.0.

The useful aminophosphonic acid derivatives are those corresponding to the formula

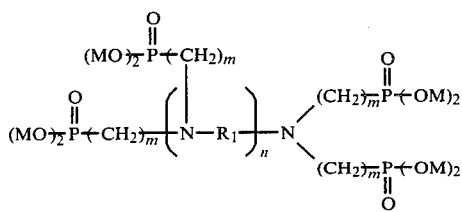

wherein M is independently selected from H, alkali metal, NH₄, and an amine radical, $R_1$ is an aliphatic straight or branched chain, cyclic or aromatic radical having from 2 to 6 carbon atoms, n is 0 to 12, and m is 1 to 3.

The polymeric acids and amides useful in the invention have the formulas

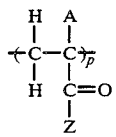

wherein A is independently hydrogen or methyl, Z is independently selected from $NH_2$ and OM and wherein M has the aforesaid meaning and p is from about 13 to about 5,500, preferably from about 25 to about 50. wherein the Z substituents may be the same or different; and

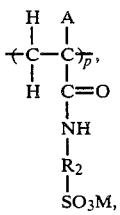

wherein $R_2$ is an alkylene radical having from 1 to 6 carbon atoms and p' is from about 5 to about 2,000, preferably 10–25, and A and M have the above indicated meanings and wherein the M substituents may be the same or different.

Copolymers of monomers of the above formulas are also useful. Thus a partially hydrolyzed polyacrylamide is effective. Such polymers have molecular weights of from about 1,000 to about 400,000.

In the pulp and paper industry where chelants are added to enhance peroxide bleaching systems, levels of chelant from 2 to 20 pounds/ton of pulp are typically used. The chelants referred to above are the carboxylic acid derivatives of amines, e.g. diethylenetriaminepentaacetic acid (DTPA), which are added at the pretreatment (prebleaching) stage to take metals out of the pulp. The chelant is partially removed in the subsequent dewatering step, but that which remains is rapidly destroyed in the bleaching step when contacted with the peroxide. The present invention adds the chelant primarily to stabilize the peroxide during the bleaching process.

The amount of phosphonate chelant and the ratio of polymer to phosphonate needed to stabilize an alkaline-peroxide system will be directly related to the level of metals present. The phosphonate is added at levels sufficient to stabilize the peroxide solution by sequestering the transition metals. The ratio of polymer to phosphonate is dependent on the concentration of hardness ions, e.g. Ca or Mg, in the system that interfere with the phosphonate's ability to chelate the transition metals. Below is a table showing recommended levels of phosphonate and polymer to be used in such systems at different levels of water hardnesses and transition metal content.

| | Wt. % (in Aqueous $H_2O_2$) Phosphonic Acid Derivative | Wt. % (in Aqueous $H_2O_2$) Polymer |
|---|---|---|
| (a) Low transition metals (2#/ton chelant) | 0.1 wt. % | 0.19 wt. % |
| (b) Low hardness* (110 ppm) | | |
| (a) High transition metals (20#/ton chelant) | 1.0 wt. % | 0.19 wt. % |
| (b) Low hardness (110 ppm) | | |
| (a) Low transition metals (2#/ton chelant) | 0.1 wt. % | 1.9 wt. % |
| (b) High hardness* (1100 ppm) | | |
| (a) High transition metals (20#/ton chelant) | 1.0 wt. % | 1.9 wt. % |
| (b) High hardness (1100 ppm) | | |

*Low hardness is any concentration of hardness (measured as $CaCO_3$) below about 150 ppm and high hardness is 250 ppm and above.

According to the above table the weight ratio in the aqueous solution of hydrogen peroxide is from about 0.05 to about 5.26 parts of phosphonic acid derivative to 1 part of polymer.

EXAMPLE 1 (RUNS 1, 2 AND A–F)

This example compares the improved effectiveness of the phosphonate-sodium polyacrylate formulation (Runs 1 and 2) over the phosphonate or polyacrylate alone (Comp. Runs A–F) as a hydrogen peroxide stabilizer in the presence of the alkaline earth metals Ca and Mg. The rate of $H_2O_2$ degradation was monitored under typical pulp bleaching conditions in the presence of 2.5 ppm Cu.

This decomposition study was conducted using a 1-liter resin kettle equipped with a 1-foot condenser, pH probe/meter, sampling tube, thermometer and magnetic stirrer. The reactor was sealed with the condenser being the only opening to the outside atmosphere. The reaction mixture was constantly agitated and the temperature maintained at 65.0°±0.2° C. by use of a circulating water bath in which the reactor kettle was partially submerged.

The reaction mixtures were prepared using deionized water and reagent grade salts and solutions. The diethylenetriamine penta(methylenephosphonic acid) (DTPMP) and sodium polyacrylate (NaPA) were commercially available products.

To the water was added the DTPMP and/or NaPA, then the Ca or Mg. After which the 2.5 ppm Cu was added and the appropriate amount of NaOH to obtain a final pH of 10.5±0.1. This solution was then transferred to the resin kettle in which it was heated. After the reaction mixture reached 65° C., the $H_2O_2$ was added.

Periodically, during each rung, the run time, temperature, pH and $H_2O_2$ concentration were measured and recorded. The samples taken for $H_2O_2$ determination were first mixed with a 5 weight percent $H_2SO_4$ solution to arrest further $H_2O_2$ decomposition. Then the $H_2O_2$ concentration was determined using the standard iodometric-thiosulfate titration method.

To determine the degree of peroxide stabilization accounted for by each component of the DTPMP-NaPA formulation in the presence of the alkaline earth metals Ca and Mg, eight separate runs were conducted.

For the study, the DTPMP to alkaline earth metal molar ratio was 1:2. This was done to simulate conditions where the phosphonate would be overwhelmed by a relatively high concentration of the alkaline earth metals and thereby inhibit the ability of DTPMP to fully complex the trace amount of Cu or other transition metals present. The uncomplexed Cu could then catalyze or accelerate the $H_2O_2$ decomposition rate. A description of the components and their respective concentrations used in each run is given in Table I. The results are shown in Table II.

TABLE I

| | CONCENTRATIONS (WT. %) | | | | | | | |
|---|---|---|---|---|---|---|---|---|
| Component | Run A | Run B | Run C | Run D | Run E | Run F | Run 1 | Run 2 |
| DTPMP | — | — | — | 0.15 | 0.15 | 0.15 | 0.15 | 0.15 |
| NaPA | 0.09 | 0.09 | 0.09 | — | — | — | 0.09 | 0.09 |
| $CaCl_2$ | — | 0.12 | — | — | 0.12 | — | 0.12 | — |
| $MgSO_4$ | — | — | 0.16 | — | — | 0.16 | — | 0.16 |
| $CuCl_2$ (as Cu) | 2.5 ppm | 2.5 ppm | 2.5 ppm | 2.5 ppm | 2.5 ppm | 2.5 ppm | 2.5 ppm | 2.5 ppm |
| $H_2O_2$ | 0.40 | 0.40 | 0.40 | 0.40 | 0.40 | 0.40 | 0.40 | 0.40 |

TABLE II

EFFECTS OF Ca and Mg ON THE $H_2O_2$ STABILIZING ABILITY OF DTPMP AND NaPA (IN THE PRESENCE OF 2.5 ppm Cu)

| | Run A | Run B | Run C | Run D | Run E | Run F | Run 1 | Run 2 |
|---|---|---|---|---|---|---|---|---|
| Ca (moles/mole DTPMP) | — | 2 | — | — | 2 | — | 2 | — |
| Mg (moles/mole DTPMP) | — | — | 2 | — | — | 2 | — | 2 |
| NaPA (g/l) | 4.4 | 4.4 | 4.4 | — | — | — | 4.4 | 4.4 |
| DTPMP (g/l) | — | — | — | 4.4 | 4.4 | 4.4 | 4.4 | 4.4 |
| Run Time (Minutes) | Percent $H_2O_2$ Degraded | | | | | | | |
| 5 | 10.0 | 12.5 | 7.5 | 0.0 | 2.5 | 2.5 | 0.0 | 0.0 |
| 10 | 17.5 | 30.0 | 15.0 | 2.5 | 5.0 | 2.5 | 2.5 | 2.5 |
| 20 | 35.0 | 50.0 | 25.0 | 2.5 | 5.0 | 5.0 | 2.5 | 5.0 |
| 30 | 52.5 | — | 37.5 | 2.5 | 5.0 | 12.5 | 5.0 | 7.5 |
| 60 | — | — | — | 5.0 | 12.5 | 25.0 | 7.5 | 10.0 |
| 90 | — | — | — | 5.0 | 17.5 | 32.5 | 7.5 | 15.0 |
| 140 | — | — | — | 7.5 | 27.5 | 45.0 | 10.0 | 25.0 |
| 200 | — | — | — | 10.0 | — | — | — | 37.5 |

The results demonstrate that in the presence of excess Ca, the DTPMP-NaPA formulation is substantially more effective as a peroxide stabilizer than is DTPMP or NaPA. It is apparent that NaPA is relatively ineffective as an $H_2O_2$ stabilizer (Run A). Within 30 minutes over half of the $H_2O_2$ had decomposed. When Ca is added along with the NaPA (Run B) the $H_2O_2$ decomposition rate appears to accelerate somewhat. DTPMP, on the other hand, was very effective in stabilizing $H_2O_2$ in the absence of Ca. In 200 minutes only 10% of the $H_2O_2$ had decomposed (Run D). But when 2 moles of Ca were added per mole of DTPMP, the $H_2O_2$ degradation rate increased rapidly to where almost 30% of the $H_2O_2$ was consumed in only 140 minutes (Run E). Then finally, when the Ca was added to the DTPMP-NaPA combination the rate of $H_2O_2$ degradation was reduced by over 60% (Run 1). In 140 minutes only 10.0% of the $H_2O_2$ was consumed.

The DTPMP-NaPA formulation was also a more effective peroxide stabilizer than the individual components in the presence of Mg. It is apparent from the data that the addition of Mg to the NaPA improves $H_2O_2$ stability. After 30 minutes only 37.5% of the peroxide had degraded with the Mg-NaPA system (Run C) while 52.5% decomposed in the absence of Mg (Run A). When Mg was added with the DTPMP, the peroxide decomposition rate accelerated substantially. After 140 minutes in the absence of Mg (Run D) only 7.5% of the peroxide had decomposed while 45% decomposed in the presence of both Mg and DTPMP (Run F). The addition of NaPA to the Mg-DTPMP mixture (Run 1) substantially reduced the degradation rate. Again after 140 minutes, only 25% of the peroxide had been consumed. This represents about a 45% improvement over the Mg-DTPMP system.

EXAMPLE 2

In the manner of Example 1 other experiments were performed in which the ratio of phosphonate and polyacrylate were varied. The conditions for these runs were as follows:

Run time ~ 4 hours
Temperature—65° C.

| Initial Conditions: | |
|---|---|
| wt. % $H_2O_2$ | 0.4 |
| wt. % $CaCl_2$ | 0.12* |
| ppm $Cu^{++}$ | 2.5 |
| pH | 10.5 ± 0.2 |

*Hardness expressed as $CaCO_3$ is 1100 ppm.

Results with respect to decomposition of peroxide are given in Table III.

| III. VARYING THE RATIO OF DTPMP TO NaPA | | | | | |
|---|---|---|---|---|---|
| DTPMP:NaPA | | | | | |
| Ratio (Wt.) | Actual ppm | Percent Peroxide Decomposition After | | | |
| | | 1 Hr. | 2 Hrs. | 3 Hrs. | 4 Hrs. |
| — | 0:1320 | 100% | — | — | — |
| 1.6:2 | 1055:1320 | 100% | — | — | — |
| — | 2110:0 | 14% | 40% | 85% | 100% |
| 3.2:1 | 2110:660 | 14% | 40% | 85% | 100% |

-continued

III. VARYING THE RATIO OF DTPMP TO NaPA

| DTPMP:NaPA Ratio (Wt.) | Actual ppm | Percent Peroxide Decomposition After | | | |
|---|---|---|---|---|---|
| | | 1 Hr. | 2 Hrs. | 3 Hrs. | 4 Hrs. |
| 6.4:2 | 4220:1320 | 14% | 20% | 25% | 27% |
| 3.2:2 | 2110:1320 | 8% | 11% | 19% | 23% |
| 3.2:6 | 2110:3960 | 7% | 9% | 12% | 18% |
| 3.2:10 | 2110:6600 | 7% | 9% | 12% | 18% |

EXAMPLE 3

Another series of runs was made employing the same conditions as in Example 2 in which the molecular weight of the polyacrylate used was varied. Results are shown in Table IV.

IV. VARYING THE SODIUM POLYACRYLATE MOLECULAR WEIGHT
Tested polymers between 1,000 and 400,000 molecular weight units. The weight ratio of DTPMP to NaPA was 3.2:6 (2110/3960 ppm)

| NaPA Molecular Weight | Percent $H_2O_2$ Degradation After | | | |
|---|---|---|---|---|
| | 1 Hour | 2 Hours | 3 Hours | 4 Hours |
| 1,000 | 8% | 14% | 17% | 20% |
| 2,000 | 4% | 6% | 7% | 8% |
| 12,000 | 6% | 8% | 10% | 11% |
| 60,000 | 4% | 6% | 7% | 8% |
| 190,000 | 4% | 6% | 7% | 8% |
| 400,000 | 6% | 8% | 10% | 11% |

EXAMPLE 4

Other phosphonates and other polymers of unsaturated acids were employed. Results as shown in Table V.

V. OTHER PHOSPHONATES AND POLYMERS

| Composition | Wt. Ratio | ppm | Percent Peroxide Decomposition After | | | |
|---|---|---|---|---|---|---|
| | | | 1 Hr. | 2 Hrs. | 3 Hrs. | 4 Hrs. |
| DTPMP:NaPA | 3.2:2 | 2110:1320 | 8% | 11% | 19% | 23% |
| DTPMP:NaPA | 3.2:6 | 2110:3960 | 7% | 9% | 12% | 18% |
| TTHMP:NaPA | 3.2:6 | 2110:3960 | 7% | 9% | 12% | 18% |
| DTPMP:PAAm | 3.2:2 | 2110:1320 | 8% | 11% | 13% | 15% |
| DTPMP:AMPS | 3.2:2 | 2110:1320 | 7% | 9% | 12% | 15% |

NaPA = 2,000 mw
AMPS (sulfonic acid derivative of a polyacrylamide) = 4,000 mw
PAAm (polyacrylamide) = 3,500 mw
TTHMP = triethylenetetraminehexa(methylenephosphonic acid).

It is to be noted that the more dilute the solution of peroxide, the more stabilizer is required. Thus, the amounts of stabilizer required to stabilize concentrated solutions, e.g. 50–70% $H_2O_2$, will be insufficient to stabilize and prevent the decomposition of $H_2O_2$ when diluted for use. If this is not taken into consideration when the concentrated solutions are prepared, more stabilizer will need to be added when these solutions are diluted for use in bleaching.

I claim:

1. In a method of inhibiting decomposition of hydrogen peroxide in aqueous solution wherein a chelant is employed the improvement which consists essentially of adding to said solution (a) an aminophosphonic acid chelant or an ammonium, alkali metal or amine salt thereof together with
    (b) at least one polymer of
        (1) an unsaturated carboxylic acid or an ammonium, alkali metal or amine salt thereof,
        (2) an unsaturated carboxylic amide or
        (3) an unsaturated carboxylic amide wherein the amide hydrogens are substituted with an alkylsulfonic acid group or an ammonium, alkali metal or amine salt thereof and wherein the (b) additive may contain a combination of said functional groups.

2. The method of claim 1 wherein the aminophosphonic acid chelant has the formula

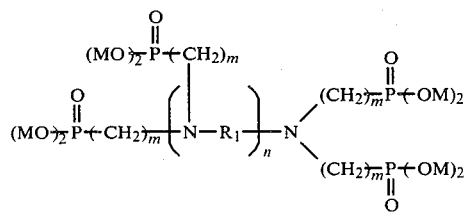

wherein M is independently selected from H, alkali metal, $NH_4$, or an amine radical, $R_1$ is an aliphatic straight or branched chain, cyclic or aromatic radical having from 2 to 6 carbon atoms, n is 0 to 12, and m is 1 to 3.

3. The method of claim 2 wherein the polymer contains monomer units having the formula

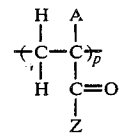

wherein A is independently hydrogen or methyl, Z is independently selected from $NH_2$ and OM and wherein M is independently selected from hydrogen, an alkali metal, ammonium and an amine radical and p is from about 13 to about 5,500 or

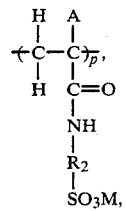

wherein $R_2$ is an alkylene radical from 1 to 6 carbon atoms and p' is from about 5 to about 2,000, and mixtures thereof and A and M have the aforesaid meanings.

4. The method of claim 3 wherein the aminophosphonic acid chelant has the formula wherein $R_1$ is ethylene, m is 1 and n is 2 and the polycarboxylic acid has the formula wherein p is an integer of from about 25 to about 50.

5. The method of claim 3 wherein the aminophosphonic acid chelant has the formula wherein $R_1$ is ethylene, m is 1 and n is 2 and the polycarboxylic sulfonamide has the formula wherein $R_2$ is an alkylene radical having 4 carbon atoms and p' is an integer of from about 10 to about 25.

6. The method of claim 3 wherein the aminophosphonic acid chelant has the formula wherein m is 1 and n is 0 and the polycarboxylic acid has the formula wherein p is an integer of from about 25 to about 50.

7. The method of claim 3 wherein the aminophosphonic acid chelant has the formula wherein m is 1 and n is 0 and the polycarboxylic sulfonamide has the formula wherein $R_2$ is an alkylene radical having 4 carbon atoms and p' is an integer of from about 10 to about 25.

8. The method of claim 3 wherein the aminophosphonic acid chelant has the formula wherein $R_1$ is ethylene, m is 1 and n is 3 and the polycarboxylic acid has the formula wherein p is an integer of from about 25 to about 50.

9. The method of claim 3 wherein the aminophosphonic acid chelant has the formula wherein $R_1$ is ethylene, m is 1 and n is 3 and the polycarboxylic sulfonamide has the formula wherein $R_2$ is an alkylene radical having 4 carbon atoms and p' is an integer of from about 10 to about 25.

10. The method of claim 3 wherein the weight ratio of additives in the aqueous hydrogen peroxide is from about 0.05 to about 5.3 parts of aminophosphonic acid chelant to one part of polymer.

11. The method of claim 10 wherein the water employed in the hydrogen peroxide solution has low hardness and the weight ratio of chelant to polymer is from about 0.53 to about 5.3 to one.

12. The method of claim 10 wherein the water employed in the hydrogen peroxide solution has high hardness and the weight ratio of chelant to polymer is from about 0.05 to about 0.52 to one.

13. An inhibited aqueous hydrogen peroxide composition which contains as inhibitor the combination consisting essentially of
(a) an aminophosphonic acid chelant or an ammonium, alkali metal or amine salt thereof and
(b) at least one polymer of
 (1) an unsaturated carboxylic acid or an ammonium, alkali metal or amine salt thereof,
 (2) an unsaturated carboxylic amide or
 (3) an unsaturated carboxylic amide wherein the amide hydrogens are substituted with an alkylsulfonic acid group or an ammonium, alkali metal or amine salt thereof
and wherein the (b) additive may contain a combination of said functional groups.

14. The composition of claim 13 wherein the aminophosphonic acid chelant has the formula

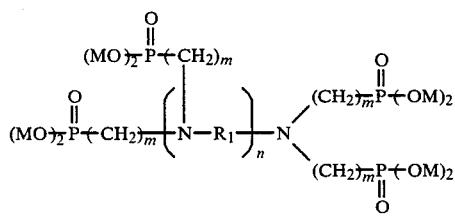

wherein M is independently selected from H, alkali metal, NH₄, and an amine radical, $R_1$ is aliphatic straight or branched chain, cyclic or aromatic radical having from 2 to 6 carbon atoms, n is 0 to 12, and m is 1 to 3 and the polymer contains monomer units having the formulas

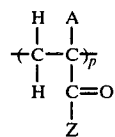

wherein A is independently hydrogen or methyl, Z is independently selected from $NH_2$ and OM and wherein M is independently selected from hydrogen, an alkali metal, ammonium and an amine radical and p is from about 13 to about 5,500 or

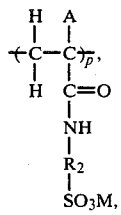

wherein $R_2$ is an alkylene radical having from 1 to 6 carbon atoms and p' is from about 5 to about 2,000, and mixtures thereof and A and M have the aforesaid meanings.

15. The composition of claim 14 wherein the weight ratio of additives is from about 0.05 to about 5.3 parts of aminophosphonic acid chelant to one part of polymer.

16. The composition of claim 14 wherein the weight percent of aminophosphonic acid chelant is from 0.1 to 1.0 and of polymer is from 0.19 to 1.9.

17. An aqueous hydrogen peroxide composition inhibited against decomposition and suitable for adding to a bleaching bath useful in bleaching cellulosic products which consists essentially of
(a) from about 5 to about 70 weight percent hydrogen peroxide,
(b) from about 2.5 to about 0.025 percent of an aminophosphonic acid chelant or an ammonium, alkali metal or amine salt thereof and
(c) at least one polymer of
 (1) an unsaturated carboxylic acid or an ammonium, alkali metal or amine salt thereof,
 (2) an unsaturated carboxylic amide or
 (3) an unsaturated carboxylic amide wherein the amide hydrogens are substituted with an alkylsulfonic acid group or an ammonium, alkali metal or amine salt thereof
and wherein the (c) additive may contain a combination of said functional groups.

18. The composition of claim 17 wherein the aminophosphonic acid chelant has the formula

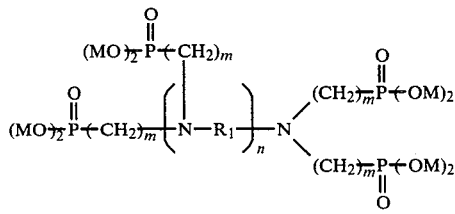

wherein M is independently selected from H, alkali metal, NH₄, and an amine radical, $R_1$ is an aliphatic straight or branched chain, cyclic or aromatic radical having from 2 to 6 carbon atoms, n is 0 to 12, and m is 1 to 3 and the polymer contains monomer units having the formulas

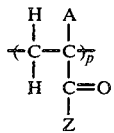

wherein A is independently hydrogen or methyl, Z is independently selected from $NH_2$ and OM and wherein M is independently selected from hydrogen, an alkali metal, ammonium and an amine radical and p is from about 13 to about 5,500 or

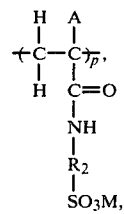

wherein $R_2$ is an alkylene radical having from 1 to 6 carbon atoms and p' is from about 5 to about 2,000, and mixtures thereof and A and M have the aforesaid meanings.

19. The composition of claim 18 wherein the aminophosphonic acid chelant has the formula wherein $R_1$ is ethylene, m is 1 and n is 2 and the polycarboxylic acid has the formula wherein p is an integer of from about 25 to about 50.

20. The composition of claim 18 wherein the aminophosphonic acid chelant has the formula wherein $R_1$ is ethylene, m is 1 and n is 2 and the polycarboxylic sulfonamide has the formula wherein $R_2$ is an alkylene radical having 4 carbon atoms and p' is an integer of from about 10 to about 25.

* * * * *